United States Patent
Chaiken et al.

(10) Patent No.: US 9,569,620 B2
(45) Date of Patent: Feb. 14, 2017

(54) METHOD FOR PROCESSING UEFI PROTOCOLS AND SYSTEM THEREFOR

(71) Applicant: Dell Products, LP, Round Rock, TX (US)

(72) Inventors: Craig L. Chaiken, Pflugerville, TX (US); Steven A. Downum, Pflugerville, TX (US); Ricardo L. Martinez, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 216 days.

(21) Appl. No.: 14/182,739

(22) Filed: Feb. 18, 2014

(65) Prior Publication Data

US 2015/0235030 A1   Aug. 20, 2015

(51) Int. Cl.
*G06F 21/57*   (2013.01)

(52) U.S. Cl.
CPC .................................. *G06F 21/572* (2013.01)

(58) Field of Classification Search
CPC combination set(s) only.
See application file for complete search history.

(56) References Cited

U.S. PATENT DOCUMENTS

| | | |
|---|---|---|
| 2009/0327741 A1 | 12/2009 | Zimmer et al. |
| 2010/0169633 A1* | 7/2010 | Zimmer .............. G06F 21/575 |
| | | 713/2 |

FOREIGN PATENT DOCUMENTS

WO   WO 2013/067486 A1   5/2013

* cited by examiner

*Primary Examiner* — Beemnet Dada
(74) *Attorney, Agent, or Firm* — Larson Newman, LLP (57) ABSTRACT

A Unified Extensible Firmware Interface protocol installer utilizes and modifies a list of global unique identifiers corresponding to Unified Extensible Firmware Interface protocols to determine whether to install a UEFI protocol.

20 Claims, 6 Drawing Sheets

METHOD FOR PROCESSING UEFI PROTOCOLS AND SYSTEM THEREFOR

FIELD OF THE DISCLOSURE

This disclosure generally relates to information handling systems, and more particularly relates to processing UEFI protocols at an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Information handling systems are increasingly relied upon for personal and business activities.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
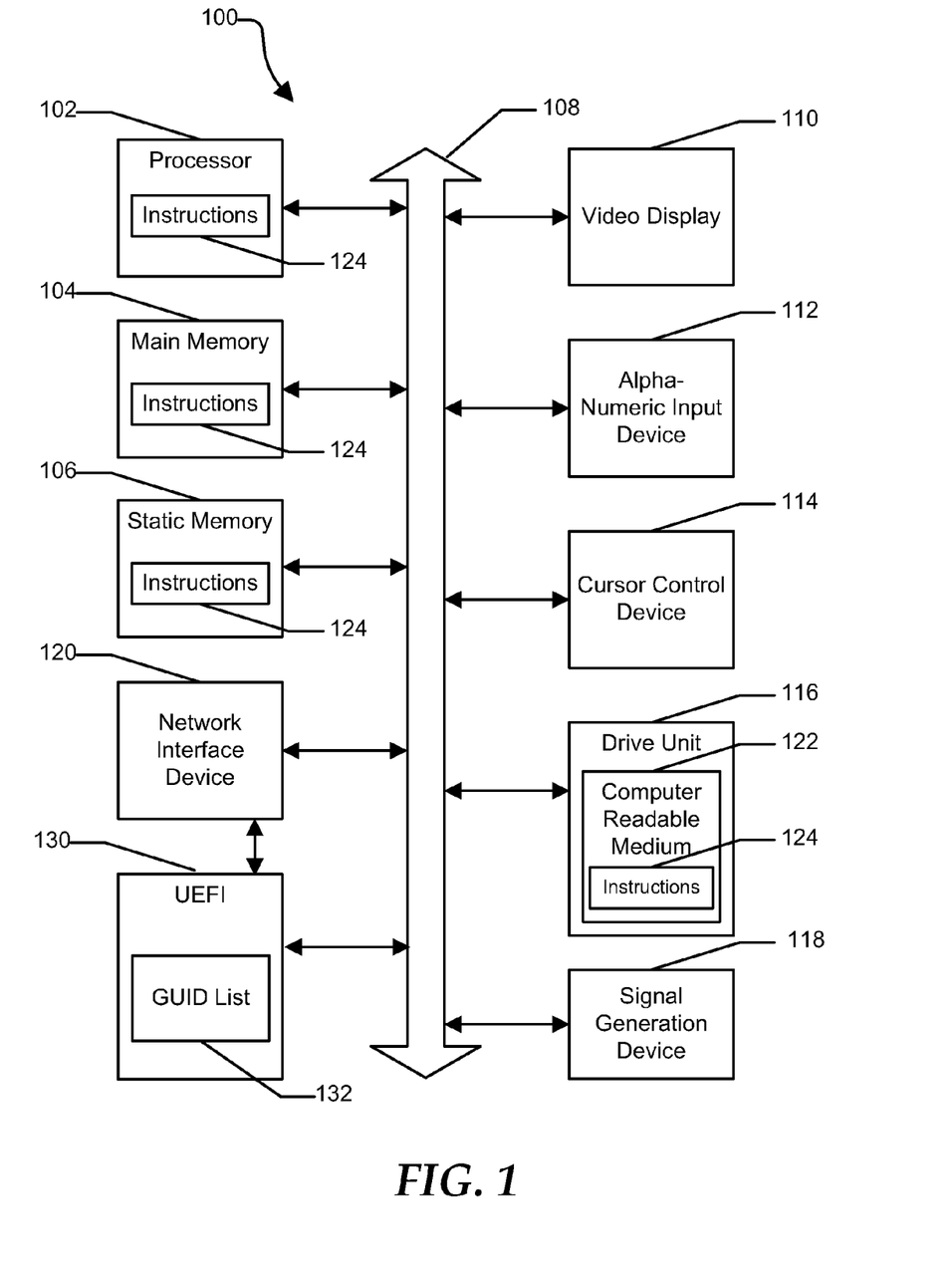
FIG. 1 is a block diagram illustrating an information handling system including a Unified Extensible Firmware Interface (UEFI) and a global unique identifier (GUID) list in accordance with a specific embodiment of the present disclosure.

FIG. 1 shows an information handling system 100 including a Unified Extensible Firmware Interface (UEFI) 130 and a global unique identifier (GUID) list 132. In accordance with specific embodiments of the present disclosure, the GUID list 132 can be used to prevent critical UEFI Protocols from being replaced by malicious programs. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device 114, such as a mouse. The information handling system 100 can also include a disk drive unit 116, a signal generation device 118, such as a speaker or remote control, and a network interface device 120. The information handling system may also include additional buses operable to transmit information between the various hardware components, and may include additional storage devices, such as non volatile memory devices. The information handling system 100 can include a service processor (not shown) to enable remote monitoring and management of aspects of the information handling system 100.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The information handling system 100 is substantially compliant with one or more revisions of the UEFI specification. The UEFI 130 replaces the antiquated basic input/output system (BIOS) found in some older information handling systems. The UEFI specification provides standard interfaces and interoperability guidelines for devices that together make up an information handling system. In particular, the UEFI 130 provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100.

The UEFI boot flow can be divided into a sequence of phases, including a pre-EFI initialization (PEI) phase, followed by a driver execution environment (DXE) phase, a boot device selection (BDS) phase, and a run time (RT) phase. The UEFI boot sequence can include additional phases, however the present disclosure relates to operations generally performed during the DXE phase, so discussion of the other phases is omitted for clarity. Furthermore, one or more phases can be subdivided into two or more sub-phases. For example, the DXE phase can include a first portion wherein trusted images are loaded, and a second portion wherein images designated as un-trusted are loaded. For example, trusted images can include bootloaders, drivers, and applications distributed by an original equipment manufacturer (OEM) of an information handling system, whereas un-trusted images can be associated with firmware not developed by the system OEM, such as drivers associated with a peripheral device installed at the system 100. As used herein, a trusted image is any image designated as such. The boot sequence typically includes loading a series of trusted images followed by a series of un-trusted images.

UEFI images can include UEFI drivers, applications, and bootloaders, and are a class of files defined by UEFI that contain executable code. A UEFI bootloader, and a boot manager in particular, is a firmware policy engine that is in charge of loading the operating system loader and all necessary drivers. UEFI applications can be loaded by the boot manager or by other UEFI applications to accomplish platform specific tasks within the boot services environment. A UEFI driver is a module of code typically inserted into firmware via protocols interfaces. UEFI drivers can be loaded by the boot manager, firmware conforming to the UEFI specification, or by other UEFI applications. Each UEFI image includes one or more UEFI protocols. A UEFI protocol, also referred to as a protocol interface, is much like a class in object-oriented programming, providing an interface structure containing data definitions, and a set of functions, such as functions to access a device. Each UEFI protocol includes a GUID, which is a 128-bit value used to differentiate services and structures in the boot services environment.

In one embodiment of the present disclosure, a UEFI protocol installer can append the GUID identifying a protocol being installed to the GUID list 132. In another embodiment, the protocol installer can prevent installation of a protocol if the protocol contains a GUID that is already included at the GUID list 132. In still another embodiment, the GUID list 132 can be pre-populated with GUIDs, for example GUIDs associated with a list of trusted protocols can be established prior to initiating boot of information handling system 100. In this case, a first protocol having a GUID included on the pre-populated GUID list can be installed; however the protocol installer can prevent any subsequent protocol having the same GUID from being installed. Operation of the information handling system 100, and UEFI 130 and GUID list 132 in particular, can be better understood with reference to FIGS. 2-6, below.

Figure 2:
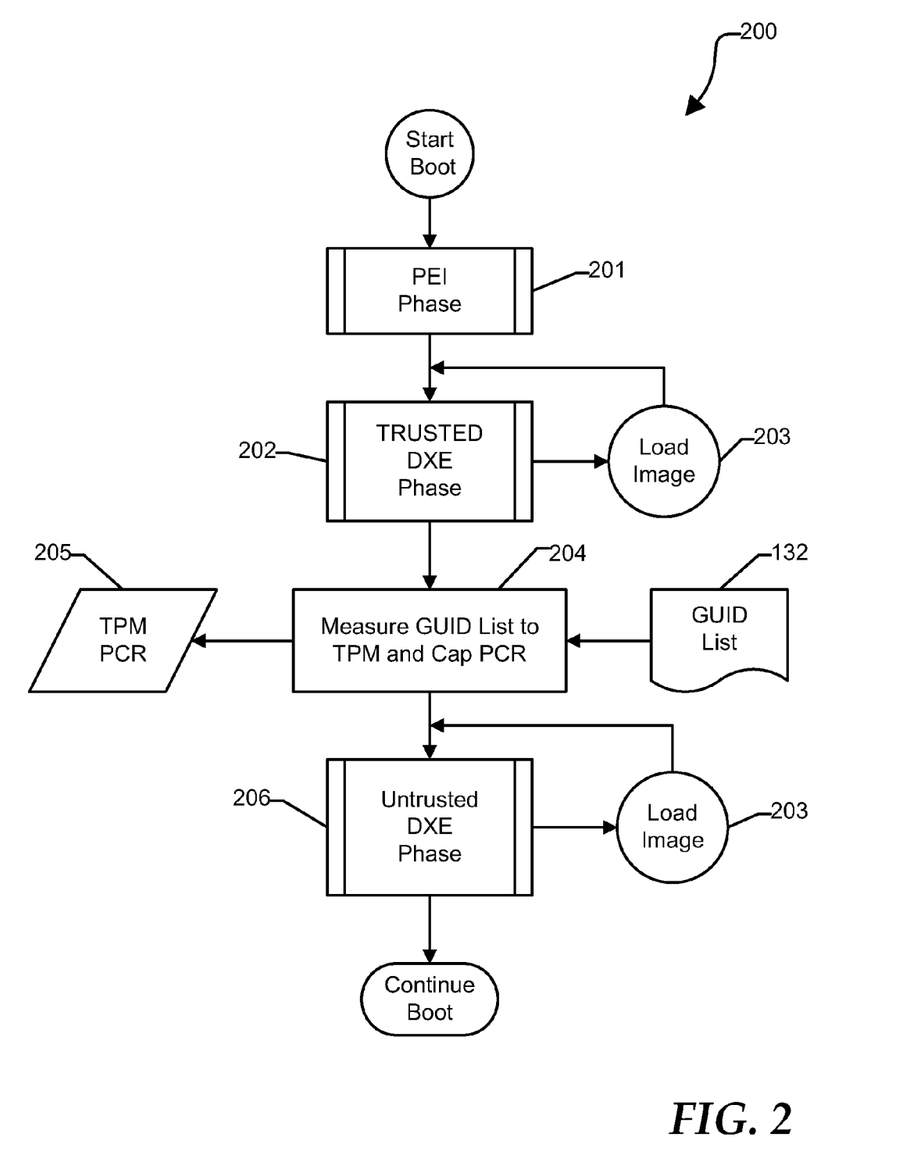
FIG. 2 is a flow diagram illustrating a boot sequence at the information handling system of FIG. 1 according to a specific embodiment of the present disclosure.

FIG. 2 shows a boot sequence 200 of information handling system 100 according to a specific embodiment of the present disclosure. In particular, boot sequence 200 illustrates operations performed during the DXE phase of the boot process. The boot sequence 200 can include additional operations, not shown for clarity. The PEI phase 201 begins early in the boot process. The PEI phase 201 initially operates with the information handling system in a nascent state, leveraging only on-processor resources, such as the processor cache as a call state, to dispatch pre-EFI initialization modules. The initialization modules are responsible for establishing initial memory resources, describing the memory in hand-off blocks (HOBs), describing the firmware volume locations in HOBs, and passing control into the DXE phase.

The sequence 200 proceeds to block 202 representing a trusted portion of the DXE phase. The DXE phase is where most of the initialization of the information handling system 100 is performed. There are several components in the DXE phase, including a DXE foundation, a DXE dispatcher, and a set of DXE drivers. The DXE foundation, also referred to as the DXE core, produces a set of boot services, runtime services, and DXE services. The DXE dispatcher is responsible for discovering and executing DXE drivers in the correct order. The DXE drivers are responsible for initializing the processor, chipset, and platform components as well as providing software abstractions for system services, console devices, and boot devices. These components work together to initialize the platform and provide the services required to boot an operating system. The DXE phase and boot device selection (BDS) phases work together to establish consoles and attempt the booting of operating systems. The DXE phase is terminated when an operating system is successfully booted. The DXE core is composed of boot services code, so no code from the DXE core itself is allowed to persist into the OS runtime environment. Only the runtime data structures allocated by the DXE core and services and data structured produced by runtime DXE drivers are allowed to persist into the OS runtime environment.

Trusted DXE phase 202 initiates execution of a plurality of trusted images, illustrated by load image 203 and described in detail below with the reference to FIGS. 3-6. In an embodiment, a GUID associated with a UEFI protocol can be appended to the GUID list 132 during the trusted DXE phase 202. At completion of the trusted DXE phase 202, the method 200 proceeds to block 204 where GUID list 132 can be measured and stored at a platform configuration register (PCR) 205 included at a trusted platform module (TPM). In an embodiment, measurement of the GUID list 132 can include calculating a hash signature based on the entirety of the GUID list 132 after trusted images have been installed. A TPM is an international standard for a secure cryptoprocessor. The TPM includes facilities for generation of secure cryptographic keys, remote attestation, and sealed storage. Remote attestation can be used to provide a nearly unforgeable hash key summary of the hardware and software configuration of an information handling system 100. The hash key summary can be used to verify that selected software at information handling system 100 has not been changed. The encryption and storage of the GUID list 132 at PCR 205 is not required. In an embodiment, storage of a hash of GUID list 132 provides an indication to the protocol installer that the trusted portion of the DXE phase has completed. Closure of the TPM PCR 205 to further modification can be referred to as capping.

The sequence 200 proceeds to block 206, which represents an untrusted portion of the DXE phase. Additional drivers, loaders, and application images can be loaded during the untrusted DXE phase 206, as indicated by load image 203. In an embodiment, protocol GUIDs are not added to the GUID list 132 during the untrusted phase. Furthermore, during the untrusted phase, the protocol installer can prevent installation of a new protocol if the GUID associated with the protocol is included at the GUID list 132.

Figure 3:
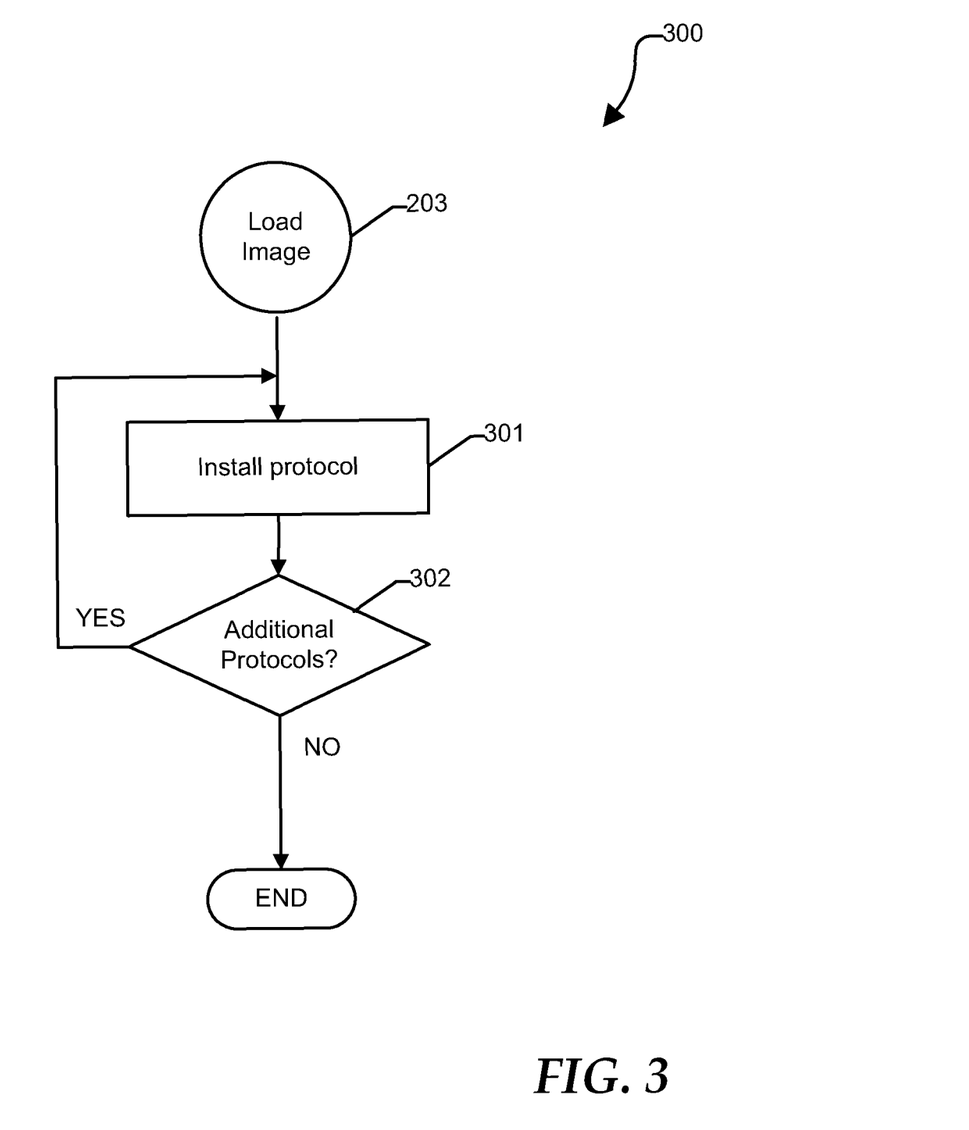
FIG. 3 is a flow diagram illustrating a UEFI load image function of FIG. 2 according to a specific embodiment of the present disclosure.

FIG. 3 shows a method 300 for implementing the LoadImage( ) function 203 of FIG. 2 according to a specific embodiment of the present disclosure. The LoadImage( ) function 203 loads a UEFI image into memory and returns a handle to the image. The image can include a plurality of protocols. For example, the function InstallProtocolInterface( ) can install a protocol interface on a device handle. A handle points to a list of one or more protocols that can respond to requests for services for a given device referred to by the handle. At block 301, an install protocol function is executed. During the trusted DXE phase, a GUID associated with the protocol can be appended to GUID list 132 and the protocol can be installed. During the untrusted DXE phase, the GUID list 132 is no longer updated, and a protocol can be installed only if a GUID associated with the protocol is not included at the GUID list 132. For example, the GUID list 132 can include GUIDs associated with each trusted UEFI protocol, and the install protocol function can prevent a trusted protocol from being over-written during the untrusted DXE phase. At block 302, it is determined whether the image includes additional protocols that need to be installed. If there are more protocols to install, the flow returns to block 301 where the next protocol is installed. Once all protocols have been installed, the flow exits. The LoadImage( ) function 203 can include additional operations, not shown for clarity. The present disclosure primarily relates to the operation of install protocol 301. The UEFI specification defines the functional architecture necessary to provide a UEFI compliant system, but the specific implementation is left to individual developers. As disclosed herein, the install protocol function 301 includes functionality in addition to that described by the UEFI specification. The additional functionality is described below with reference to FIGS. 4-6.

Figure 4:
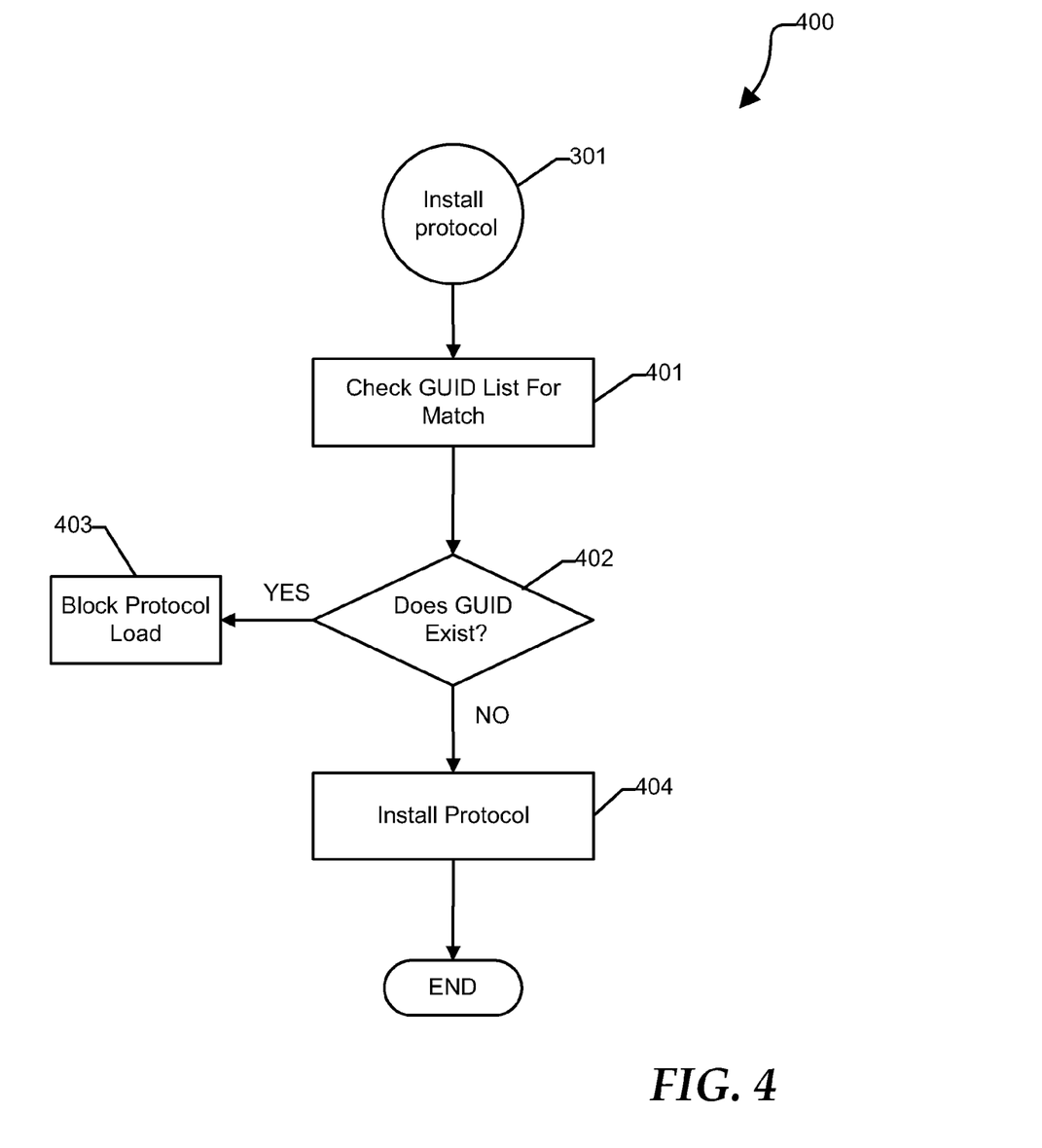
FIG. 4 is a flow diagram illustrating a UEFI install protocol function of FIG. 3 according to a specific embodiment of the present disclosure.

FIG. 4 shows a method 400 for implementing the install protocol function 301 of FIG. 3 according to a specific embodiment of the present disclosure. The flow begins at block 401 where it is determined whether the GUID identifying the protocol being installed is already included at the GUID list 132. If the protocol GUID is included at the GUID list 132, the flow proceeds from decision block 402 to block 403, where the protocol is blocked from being loaded. Blocking installation of the protocol can prevent a program from replacing a trusted protocol that has already been installed with a potentially malicious protocol. If however the protocol GUID is not included at the GUID list 132, the flow proceeds from decision block 402 to block 404, where installation of the protocol is completed. In an embodiment, a log file can be updated to identify a protocol and an associated image that has been prevented from being installed. In another embodiment, the calling device that is presently being serviced can be notified of the failure to install the protocol, according to the policies of the UEFI specification.

Figure 5:
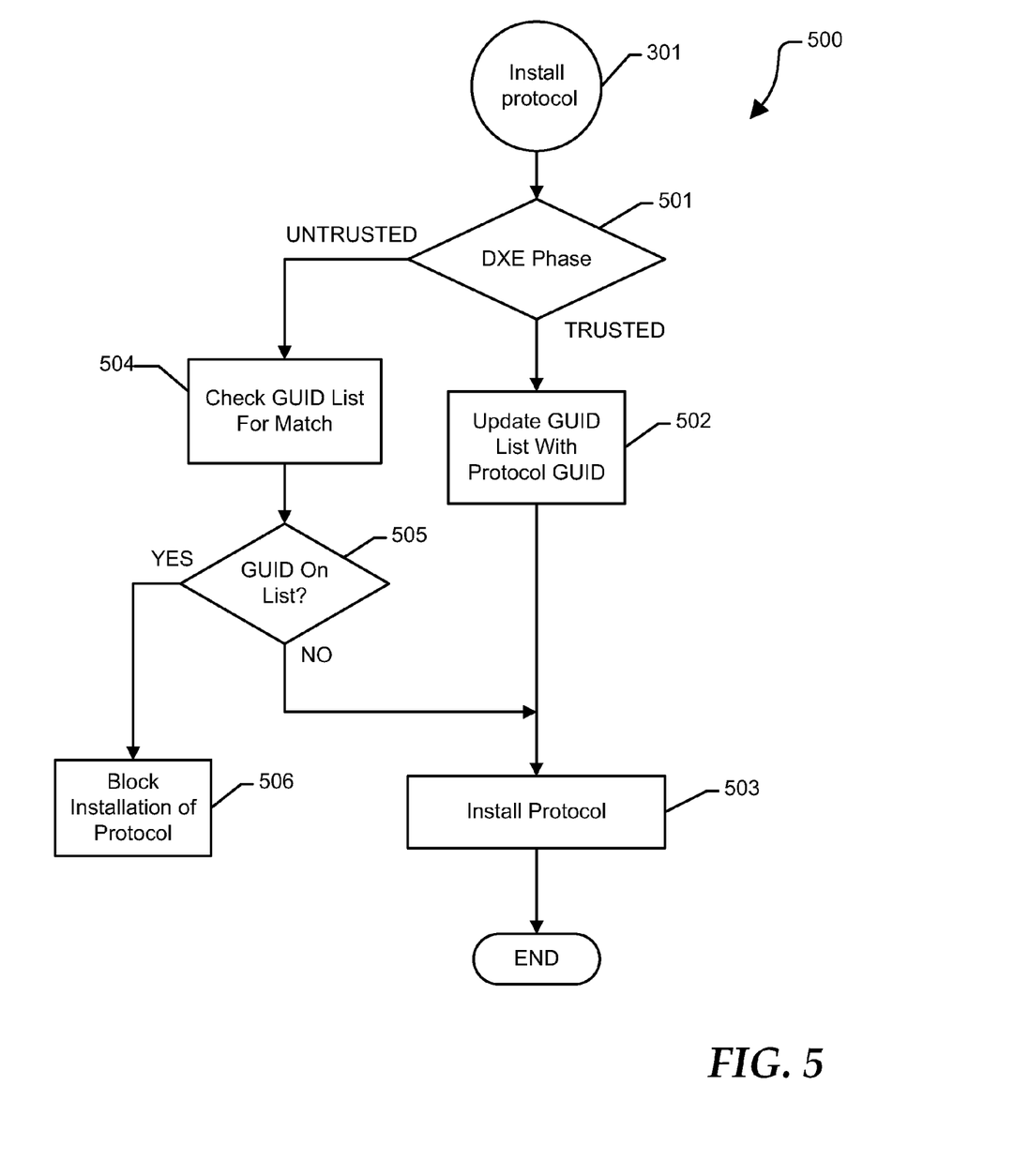
FIG. 5 is a flow diagram illustrating a UEFI install protocol function of FIG. 3 according to a specific embodiment of the present disclosure.

FIG. 5 shows a method 500 for implementing the install protocol function 301 of FIG. 3 according to a specific embodiment of the present disclosure. The flow begins at decision block 501 where it is determined whether a request to install a protocol is occurring during the trusted DXE phase or during the untrusted DXE phase. If the request to install the protocol occurs during the trusted phase, the method proceeds to block 502 where the GUID list 132 can be updated with the GUID associated with the request. The flow proceeds to block 503 where the UEIF protocol can be installed. Returning to decision block 501, if the request occurs during the untrusted phase, the method proceeds to block 504 where it is determined whether the GUID identifying the protocol being installed is included at the GUID list 132. If the protocol GUID is included at the GUID list 132, the flow proceeds from decision block 505 to block 506 where the protocol is blocked from being loaded. Blocking installation of the protocol can prevent a program from replacing a trusted protocol that has already been installed with a potentially malicious protocol. If however the protocol GUID is not included at the GUID list 132, the flow proceeds from decision block 505 to block 503, where the UEIF protocol can be installed.

In an embodiment, the install protocol function can query the TPM PCR 205 to determine whether the installation request is occurring during the trusted DXE phase or during the untrusted DXE phase. For example, if the PCR 205 is empty, it can be determined that the trusted DXE phase has not yet completed. At the completion of the trusted DXE phase, the GUID list 132 can be measured and stored at the TPM PCR 205. Therefore, the PCR 205 will no longer be empty; indicating the boot sequence 200 has progressed to the untrusted DXE phase 206.

Figure 6:
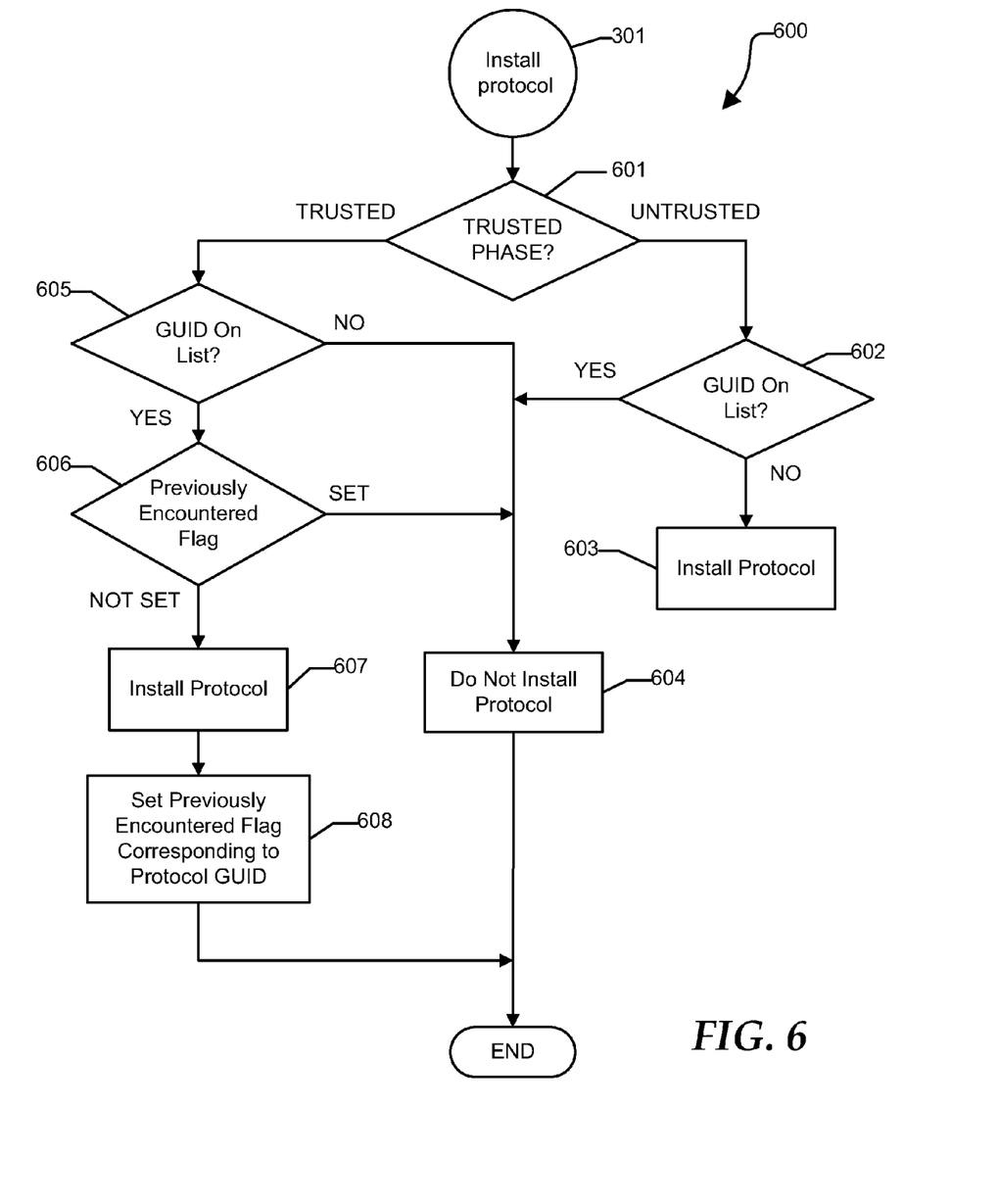
FIG. 6 is a flow diagram illustrating a UEFI install protocol function of FIG. 3 according to another embodiment of the present disclosure.

FIG. 6 shows a method 600 for implementing the install protocol function 301 of FIG. 3 according to another embodiment of the present disclosure. The method 600 is similar to method 400 and 500, except the GUID list 132 is pre-loaded with a set of protocol GUIDs at the time that the trusted DXE phase is initiated. The method begins at decision block 601 where it is determined whether the install protocol function 301 is encountered during the trusted DXE phase or during the untrusted DXE phase. If the install protocol function is encountered during the untrusted phase, the method proceeds to decision block 602 where it is determined whether a GUID associated with the current protocol is included at a pre-loaded GUID list. If the protocol is not included at the pre-loaded GUID list 132, the method proceeds to block 603 where the protocol can be installed. If the protocol GUID is included at the pre-loaded GUID list 132, the flow proceeds to block 604 where the protocol prevented from being installed. For example, the GUID list 132 can be populated with a set of protocol GUIDs corresponding to trusted UEFI images. If an image including a trusted protocol GUID is encountered during the untrusted phase, the protocol is not installed, to prevent the trusted protocol from being over-written, such as by a malicious image. The pre-loaded GUID list can be included at a firmware non-volatile memory at the time that information handling system 100 is reset or at the time that power is applied to system 100. Alternatively, GUID list 132 can be loaded from a storage device by execution of intrinsic firmware instructions before any UEFI images are loaded. For example, the pre-loaded GUID list 132 can be retrieved from a key management server external to the information handling system 100, from a service processor included at the system 100 (not shown at FIG. 1), or from another location.

Returning to decision block 601, if the install protocol function is encountered during the trusted phase, the method proceeds to decision block 605, where it is determined whether the GUID associated with the protocol is included at the pre-loaded GUID list 132. If the GUID is not included at the list, the flow proceeds to block 604 where the protocol is prevented from being installed. For example, the pre-loaded GUID list can be used to verify that all protocols loaded during the trusted DXE phase are included at the pre-loaded GUID list 132. In another embodiment, decision block 605 can be omitted, and the method can proceed directly from decision block 601 to block 606. Returning to decision block 605, if the GUID associated with the present protocol is included at the pre-loaded GUID list 132, the method proceeds to block 606 where it is determined whether a previously-encountered flag associated with the protocol GUID is set. If the previously-encountered flag is set, the flow proceeds to block 604 where the protocol is prevented from being installed. If the previously-encountered flag is not set, the flow proceeds to block 607 where the protocol can be installed. After installing the protocol, the flow proceeds to block 608 where the previously-encountered flag corresponding to the protocol GUID is set. For example, the first time a protocol GUID included at the pre-loaded GUID list 132 is encountered, the protocol can be installed, and the previously-encountered flag is set to indicate that the protocol was successfully installed. If another protocol having the same GUID is later encountered, the previously-encountered flag can prevent the new protocol from replacing the previously installed protocol. In an embodiment, blocks 606 and 608 can be omitted, and protocols associated with GUIDs included at the pre-loaded GUID list 132 can be installed without considering a previously-encountered flag. In still another embodiment, blocks 605, 606, and 608 can be omitted, and all protocols encountered during the trusted DXE phase can be installed without further scrutiny.

In an embodiment, a previously-encountered flag associated with an entry at the protocol GUID list can be provided using a register implemented in hardware or in software. For example, each entry at the protocol GUID list can be associated with a corresponding bit of a register, and setting a flag associated with a protocol GUID at the list can include storing a predetermined value at the corresponding bit location of the register.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124, such as software, can be embedded. Further, the instructions 124 may embody one or more of the methods or logic as described herein. In a particular embodiment, the instructions 124 may reside completely, or at least partially, within the main memory 104, the static memory 106, and/or within the processor 102 during execution by the information handling system 100. The main memory 104 and the processor 102 also may include computer-readable media. The network interface device 120 can provide connectivity to a network 126, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 124 or receives and executes instructions 124 responsive to a propagated signal; so that a device connected to a network 126 can communicate voice, video or data over the network 126. Further, the instructions 124 may be transmitted or received over the network 126 via the network interface device 120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A computer implemented method comprising:
   receiving a request to install a first Unified Extensible Firmware Interface (UEFI) protocol at a UEFI load image function during execution of firmware of an information handling system;
   initiating a UEFI install protocol function in response to receiving the request; and
   preventing the installation of the first UEFI protocol in response to determining at the install protocol function that a global unique identifier (GUID) associated with the first UEFI protocol is included at a protocol GUID list.

2. The method of claim 1, further comprising:
   appending the GUID associated with the first UEFI protocol to the protocol GUID list in response to determining at the install protocol function that the GUID is not included at the protocol GUID list.

3. The method of claim 1, further comprising:
   installing the first UEFI protocol in response to determining at the install protocol function that the GUID associated with the first UEFI protocol is not included at a protocol GUID list.

4. The method of claim 1, further comprising:
   appending a message to a log, the message identifying that the request to install the first UEFI protocol was prevented.

5. The method of claim 1, further comprising:
   providing a message to a device associated with the request to install the first UEFI protocol, the message identifying that the request to install the first UEFI protocol was prevented.

6. The method of claim 1, wherein the first UEFI protocol is associated with a UEFI image.

7. The method of claim 1, further comprising:
   receiving a request to install a second UEFI protocol at the information handling system; and
   allowing installation of the second UEFI protocol without considering the protocol GUID list in response to determining at the install protocol function that a trusted driver execution environment phase has not completed.

8. The method of claim 1, further comprising:
   storing a hash corresponding to the protocol GUID list at a platform configuration register included at a trusted platform module.

9. A computer implemented method comprising:
   receiving a first request to install a first Unified Extensible Firmware Interface (UEFI) protocol at a UEFI load image function during execution of firmware of an information handling system;
   initiating a UEFI install protocol function in response to receiving the request;
   determining at the UEFI install protocol function that a global unique identifier (GUID) associated with the first UEFI protocol is included at a protocol GUID list, the contents of the list established prior to initiating boot of the information handling system; and
   preventing installation of the first UEFI protocol in response to the determining.

10. The method of claim 9, further comprising preventing installation of the first UEFI protocol in response to determining at the install protocol function that a trusted driver execution phase has completed.

11. The method of claim 10, further comprising determining at the install protocol function that the trusted driver execution phase has completed based on information stored at a platform configuration register.

12. The method of claim 11, wherein the platform configuration register is included at a trusted platform module.

13. The method of claim 9, further comprising:
    receiving at the UEFI load image function a request to install a second UEFI protocol at the information handling system; and
    allowing installation of the second UEFI protocol in response to determining at the install protocol function that a trusted driver execution phase has not completed.

14. The method of claim 9, wherein the first UEFI protocol is associated with a UEFI image.

15. An information handling system comprising:
    a memory; and
    computer-readable instructions stored at the memory and executable by a microprocessor to:
    receive a request to install a first Unified Extensible Firmware Interface (UEFI) protocol at a UEFI load image function during execution of firmware of an information handling system;
    initiating a UEFI install protocol function in response to receiving the request; and
    prevent the installation of the first UEFI protocol in response to determining at the install protocol function that a global unique identifier (GUID) associated with the first UEFI protocol is included at a protocol GUID list.

16. The system of claim 15, wherein the instructions are further to:
    append the GUID associated with the first UEFI protocol to the protocol GUID list in response to determining at the install protocol function that the GUID is not included at the protocol GUID list.

17. The system of claim 15, wherein the instructions are further to:
    install the first UEFI protocol in response to determining at the install protocol function that the GUID associated with the first UEFI protocol is not included at a protocol GUID list.

18. The system of claim 15, wherein the instructions are further to:
    append a message to a log identifying that the request to install the first UEFI protocol was prevented.

19. The system of claim 15, wherein the first UEFI protocol is associated with a UEFI image.

20. The system of claim 15, wherein the instructions are further to:

receive a request at the UEFI load image function to install a second UEFI protocol at the information handling system; and allow the installation of the second UEFI protocol without considering the protocol GUID list in response to determining at the install protocol function that a trusted driver execution environment phase has not completed.

* * * * *